3,839,515
SHAPED ARTICLES OF ISOTROPIC CARBON AND A METHOD FOR MAKING THE SAME
George R. Romovacek, Pittsburgh, Pa., assignor to Koppers Company, Inc.
No Drawing. Filed Apr. 26, 1972, Ser. No. 247,810
Int. Cl. C10c 3/04
U.S. Cl. 264—29                                                      1 Claim

ABSTRACT OF THE DISCLOSURE

A method is disclosed for making shaped articles composed of isotropic carbon from liquid hydrocarbon distillates by contacting the distillates with a gas-containing elemental oxygen to produce a pitch-like substance, removing the low boiling constituents to yield a residue, shaping the residue to a desired configuration and carbonizing the shaped residue in an inert atmosphere at temperatures in excess of 800° C. to yield the shaped article composed of isotropic carbon.

BACKGROUND OF THE INVENTION

This invention relates to shaped articles of isotropic carbon and to a method for making the same from liquid hydrocarbon distillates.

Heretofore, shaped articles of graphite or amorphous carbon have been made from two intimately mixed ingredients, namely, an organic binder material and a filler material. Typical organic binder materials have included coal tar pitch, polymerized furfural alcohol and the like. Typical filler materials have included coke, petroleum coke and the like.

In the manufacture of shaped articles, filler material having a known and predetermined particle size distribution is intimately blended in a predetermined ratio with the organic binder material. The blended materials are subsequently molded in a conventional press under pressure at some elevated temperature and heat treated to 900–1000° C. in an inert atmosphere to carbonize the blended material. If a graphitized structure is desired the carbonized article is heat treated to 2800–3000° C. to convert the carbon into graphite.

The disadvantages of this conventional technique are numerous. For example, the filler material must have a critical particle size distribution in order that a homogenous and strong article can be formed when the filler material is blended with the binder material. Expensive crushing, grinding, and screening equipment must be used to produce a filler material having the desired particle size distribution.

Expensive blending equipment is also needed to achieve an intimate mixture of the filler and of the binder material. Great care and caution must be exercised in blending the filler and binder materials together in order to achieve the correct ratio. Accordingly, weighing or measuring equipment is needed to achieve proper proportion of the binder and filler materials. Additionally, storage facilities for the two ingredients are required.

The foregoing disadvantages are completely overcome in my invention which uses only one ingredient for making shaped articles. But, more importantly, the shaped articles made in accordance with my invention are composed of isotropic carbon. Isotropic carbon, as used herein, refers to elemental carbon having a physical structure such that it has the same physical and chemical properties in any given spatial direction. In appearance, isotropic carbon is a hard, glass-like, infusible, shiny, black substance. Whether a particular sample of carbon is isotropic carbon or anisotropic carbon (i.e., having a physical structure such that it exhibits different physical and chemical properties according to the structural orientation) is determined by the microscopic observation of a sample of the carbon in a metallographic microscope. Typically, a sample of the carbon is mounted in an epoxy-type resin mount and polished to a mirror smooth surface finish. The polished surface is observed under a conventional metallographic microscope in reflected polarized light with crossed Nicols. If the sample is isotropic carbon there will be no change in the intensity of the reflected polarized light as the sample is rotated; however, the intensity of the reflected polarized light will change upon rotation if the sample is anisotropic carbon.

Some of the peculiar characteristics of isotropic carbon are that it cannot be converted to graphite even at temperatures of 3000° C. and that it is of a turbostratic structure of very small crystallic size. Isotropic carbon is characterized further by being remarkably resistant to attack by strong mineral acids including hydrofluoric acid.

SUMMARY OF THE INVENTION

In accordance with the invention a shaped article composed of isotropic carbon is made from a liquid hydrocarbon distillate. The liquid hydrocarbon distillate is intimately contacted with a gas-containing elemental oxygen at a temperature of about 250–420° C. until the distillate is converted to a pitch-like substance that yields isotropic carbon upon its carbonization at temperatures in excess of 800° C. The pitch-like substance is carefully devolatilized to produce a residue that has a coking value of at least 75%. This residue is molded to a desired configuration and then carbonized at temperatures in excess of 800° C. to convert the shaped residue to isotropic carbon.

DESCRIPTION

The expression "Hydrocarbon distillate" as used herein refers to both coal tar distillates and petroleum distillates. The expression "coal tar distillate" as used herein refers to the distillate substances that are derived from the distillation of coal tar. The expression "petroleum distillate" as used herein refers to the material separated from a crude or a synthetic petroleum oil by physical means such as, for example, by distillation or extraction.

In accordance with the invention a selected hydrocarbon distillate is converted from a substance having oily characteristics to a substance having pitch-like characteristics by intimately contacting the distillate with a gas containing elemental oxygen under reaction conditions at elevated temperatures and at pressures that are sufficient to suppress the vaporization of the distillate at that elevated temperature until the disillate changes to a pitch-like substance that will yield isotropic carbon upon carbonization at temperatures in excess of 800° C. Usually a minimum of about one half (0.5) standard cubic feet (s.c.f.) of elemental oxygen is reacted with one (1) pound of the distillate to convert it to the desired pitch-like substance. Subsequently, the lower boiling constituents of the oxidized distillate are distilled off, yielding a residue having a coking value of at least 75%. This residue is shaped to any desired configuration under pressure and, then, carbonized in an inert atmosphere at temperatures in excess of 800° C. to convert the residue to isotropic carbon.

Both coal tar distillates and petroleum distillates may be used in the practice of the invention. The preferred coal tar distillates to be used in the practice of the invention are the distillate oils that have a boiling point range from 200–400° C. and usually comprise the so-called light, medium and heavy tar oil fractions. Such fractions are readily and commercially available from a number of sources. The physical properties of a typical coal tar distillate in its original unoxidized state and in its oxidized state for use in the practice of the invention are given in Table I below:

TABLE I

| Physical properties: | Coal tar distillate | Oxidized coal tar distillate |
|---|---|---|
| Softening point (ring & ball), ° C | | 80–120 |
| Benzene insolubles, percent by wt | Trace | 20.0–40.0 |
| Quinoline insolubles, percent by wt | Trace | 0.3–0.5 |
| Conradson C.V., percent by wt | 2–5 | 30–50 |
| Distillation (ASTM D246): | | |
| IBP (initial boiling point), ° C | 200 | |
| Cumulative distillate, percent: | | |
| To 210° C | 0 | |
| To 235° C | 2.1 | |
| To 270° C | 12.6 | |
| To 315° C | 36.3 | 3.3 |
| To 355° C | 80.2 | 38.2 |
| Residue over 355° C | 19.2 | 55.0–70.0 |
| Elemental composition, percent by wt.: | | |
| Carbon | 89.0–94.0 | 90.0–92.0 |
| Hydrogen | 4.0–7.0 | 4.0–5.0 |
| Oxygen | 1.0–2.0 | 2.0–4.0 |
| Sulfur | 0.2–0.8 | 0.2–0.6 |
| Nitrogen | 1.0–2.5 | 1.0–1.5 |

The preferred petroleum distillates to be used in the practice of the invention are the straight run distillates boiling between 200 and 600° C. and catalytically cracked recycle oils boiling between 200 and 500° C. Such distillates are readily and commercially available from a number of sources. The physical properties of a typical petroleum distillate in its original and unoxidized state and in its oxidized state for use in the practice of the invention are given in Table II below:

TABLE II

| Physical properties | Petroleum distillate | Oxidized petroleum distillate |
|---|---|---|
| Pour point, ° C | | 73 |
| Distillate range (ASTM D246): | | |
| IBP (initial boiling point) ° C | 267 | 283 |
| Cumulative distillate, percent: | | |
| To 270° C | 1.3 | |
| To 300° C | 31.3 | 8.1 |
| To 315° C | 47.3 | 19.2 |
| To 355° C | 78.9 | 30.3 |
| To 375° C | 87.5 | 44.6 |

Air is the preferred oxygen-containing gas for intimately contacting the liquid hydrocarbon distillate in accordance with the invention.

It is believed that a critical feature of the invention is the threshold amount of elemental oxygen that combines with the hydrocarbon distillate to produce the pitch-like substance that subsequently is converted into isotropic carbon. It has been found that a minimum of 0.5 standard cubic feet (s.c.f.) or more of elemental oxygen must be reacted with each pound of hydrocarbon distillate in the contact reaction to produce a pitch-like substance that is a satisfactory precursor for making isotropic carbon. At a reaction of less than 0.5 s.c.f. of oxygen per pound of distillate the resultant product yields anisotropic carbon upon subsequent carbonization. On the other hand, when the hydrocarbon distillate has been reacted with 0.5 s.c.f. or more of elemental oxygen the resultant product upon subsequent carbonization yields isotropic carbon. The elemental oxygen consumption is conveniently measured by oxygen balance as the difference between the amount of elemental oxygen charged into the hydrocarbon distillate and the amount of elemental oxygen that leaves the hydrocarbon distillate during the reaction of the oxygen-containing gas with the distillate.

In the preferred embodiment of the invention, air is uniformly dispersed throughout the hydrocarbon distillate by blowing air into it at temperatures of 250–420° C.; however, the preferred temperature range is between about 350–370° C. In this preferred temperature range, the reaction rate of elemental oxygen with the hydrocarbon distillate is so fast that the concentration of residual oxygen in the exit gases from the hydrocarbon distillate may be maintained below the lower explosion limit of the exit gases that are saturated with hydrocarbon vapors. To suppress the vaporization of the hydrocarbon distillates at these temperatures, the air blowing should be carried out under pressure, preferably at 80–100 psi. The air should be dispersed throughout the hydrocarbon distillate in a fine and intimate dispersion to achieve a high reaction rate of the elemental oxygen in the air with the hydrocarbon distillate.

Upon the intimate contacting of the air with the hydrocarbon distillate in accordance with this invention, the liquid hydrocarbon distillate in time changes in character from an oily liquid to a pitch-like substance. The pitch-like substance has physical properties that render it a good precursor for making isotropic carbon. Typical properties of the pitch-like substance or the oxidized hydrocarbon distillates are illustrated in the two tables above, Tables I and II.

The manner by which the liquid hydrocarbon distillate is converted to a pitch-like substance is not well understood. It is believed, however, that oxygen induces the formation of free radicals from the hydrocarbon molecules constituting the distillate which readily recombine and increase the molecular weight of the distillate. Most of the oxygen that has reacted with the distillate subsequently escapes therefrom in the exit gases as water vapor, but a part of the oxygen remains incorporated into the high molecular weight, pitch-like substance.

The oxidized distillate includes a portion of relatively lower boiling original constituents. It is necessary to remove these lower boiling constituents from the oxidized distillate to decrease its volatility so that the probability of forming a very porous structure during carbonization is minimized.

Various techniques well known to those skilled in the art may be used to remove the lower boiling constituents from the pitch-like substance. For example, vacuum distillation techniques may be used wherein the pitch-like substance is charged into a conventional distillation tower having in its interior a plurality of conventional bubble trays, means for heating the pitch-like substance and a means for creating a vacuum. Or, vacuum evaporation techniques may be used wherein the pitch-like substance is charged into a vacuum evaporator. A vacuum of about 5 torr is created in the evaporator and the pitch-like substance is gradually heated to a temperature of about 300° C. and held at that temperature for about one hour. It is critical that the pitch-like substance in either case is not overheated so as to avoid coking the pitch-like substance. The pitch-like substance is devolatilized until a residue having a minimum coking value of 75% is obtained as determined by ASTM test D-2416–68.

Alternatively, extraction techniques may be employed to remove the lower boiling constituents from the pitch-like substance wherein solvents such as, for example, benzene which are capable of solubilizing the lower boiling constituents may be used.

After the lower boiling constituents have been removed from the pitch-like substance a residue is obtained comprising about 40% by weight of the total weight of oxidized distillate originally charged into the evaporator. The balance of the original oxidized distillate which has been evaporated may be recirculated and reblown with an oxygen-containing gas and reprocessed as hereinbefore described.

The residue may then be molded to any desired configuration. Preferably, it may be molded in a hot press at elevated temperatures of about 240° C. and at a pressure of about 10,000 p.s.i. The shaped product so produced is brittle and friable.

The shaped residue is carbonized by gradually heating it to at least 800° C. in an inert atmosphere and holding it at that temperature for about one hour until the isotropic carbon is formed. A conventional oven or kiln having means for purging the oven with an inert gas such as nitrogen or argon may be used for the carbonization of the shaped residue.

The carbon product made in accordance with this invention is composed of isotropic turbostratic carbon which is resistant to graphitization. Partial graphitization of the isotropic carbon can be achieved, however, by heat treating it at temperatures of 2500 to 3000° C. It is believed that the graphitization is hindered because of the presence of a high concentration of lattice defects in the carbon which were developed due to the polymerization and condensation of the hydrocarbon distillates induced by the oxygen consumed in converting the distillate to its pitch-like substance.

The following examples illustrate the practice of the present invention and further illustrate the critical features of the invention.

EXAMPLE I 1550 grams of a coal tar distillate (creosote oil) was charged into a closed reaction vessel, was heated to a temperature of 316° C. and was oxidized or blown with air for 4 hours at an elevated pressure of 86 p.s.i.g. while maintaining the distillate at a temperature of 316° C. The air was introduced as a fine dispersion of air into the coal tar distillate at the bottom of the reactor at a rate of 1.32 s.c.f./kg./hr. From an oxygen balance, it was found that the total amount of elemental oxygen that was consumed was 42 gms. of elemental oxygen per kilogram of coal tar distillate. The air blown distillate had the following distillation range as determined by ASTM test D246:

Initial Boiling Point (IBP) _____°C__ 231
Cumulative Distillate:
    to 270° C. _____percent__ 4.8
    to 300° C. _____do__ 12.3
    to 315° C. _____do__ 16.5
    to 355° C. _____do__ 53.6

An aliquot of the air blown distillate was removed from the reaction vessel and placed into a plurality of glass dishes. The dishes were placed into a closed vessel having an internal electrical heater and a means for creating a vacuum in the vessel.

A vacuum of 5 torr was created in the vessel and the aliquot in the dishes was gradually heated to 300° C. and held there for one hour. The aliquot was cooled to ambient temperatures and the vacuum was released. The residue resulting from this distillation was withdrawn from the vessel and was found to yield 43% by weight of the original aliquot charged into the vessel. The residue had a coking value of 86% by weight, as determined in accordance with ASTM test D-2416-68.

The residue in the glass dishes was removed and pressed into circular discs of 7/8" diameter and 1/4" thickness in a conventional press at 10,000 p.s.i. at 240° C. and held at that pressure for about 30 minutes. The shaped articles were supported in a refractory dish and placed into a conventional electric kiln. The kiln was purged with nitrogen gas and the shaped articles were carbonized in the kiln by gradually heating them at a rate of 3°/minute up to 1000° C. and held at that temperature for about one hour while the inert atmosphere of nitrogen gas was maintained in the kiln. The physical properties of the carbonized shaped articles were as follows:

Density _____ 1.3 grams/cc.
Porosity _____ 26 percent.
Compressive Strength _____ 13,000 p.s.i.
Coefficient of Thermal Expansion __ 2.5–3.0×10$^{-6}$/° C.

A portion of the shaped article was examined under a metallographic microscope at a magnification of 800× using reflected polarized light and crossed Nicols. The sample was identified as isotropic carbon as the intensity of the reflected polarized light did not vary as the sample was rotated perpendicular to the axis of observation.

EXAMPLE II

An aliquot of the pitch-like substance of Example I was placed into glass dishes and charged into the closed vessel described in Example I for distillation. A vacuum was created of 5 torr and the aliquot was heated to a temperature of 300° C. and held at that temperature for about twenty (20) minutes. The aliquot was cooled to ambient temperature and the vacuum in the vessel was then released. The aliquot yielded about 80% based on the total amount of pitch-like substance originally charged into the distillation vessel. The coking value of the sample was 60% as determined by ASTM test D-2416-68.

The residue was shaped and was carbonized in the same manner as described in Example I. The carbonized shaped product was macroporous and deformed beyond all original shape and thus unsuitable as a shaped article.

While the shaped articles made in accordance with my invention are derived from a single component, namely, hydrocarbon distillates, it will be apparent to those skilled in the art that, if desired, various types of fillers could be admixed with the oxidized hydrocarbon distillates prior to shaping or molding to provide a shaped article with different properties. For example, graphite could be admixed with the oxidized hydrocarbon distillate in a desired weight ratio and shaped and carbonized in accordance with my invention to provide a shaped article having a lower electrical resistivity.

Shaped articles made in accordance with my invention have a countless number of uses. For example, they are useful in the aerospace industry because they have a high melting point, high strength over a wide temperature range, excellent resistance to thermal and mechanical shock, low density and excellent chemical and mechanical erosion resistance. Specific applications of the shaped articles for the aerospace industry includes nozzles and the like. Shaped articles made in accordance with my invention are useful and a variety of anode applications because they have a long life and a high degree of insolubility in molten metals, high purity, low over voltage. Shaped articles made in accordance with my invention are useful as electrical brushes and the like because they have high electrical resistance which is essential for sparkless commutation on most high voltage machines.

What is claimed is:

1. A method for making shaped isotropic carbon articles from hydrocarbon distillates selected from coal tar distillates boiling between about 200–400° C., straight run petroleum distillates boiling between about 200–600° C. and catalytically cracked recycle petroleum distillates boiling between about 200–500° C. comprising:
    (a) reacting the distillate with a gas containing elemental oxygen at a temperature of from about 250° to about 420° C. until at least about 0.5 standard cubic foot of elemental oxygen is reacted per pound of distillate and the distillate is converted into an oxidized distillate which is a pitch like substance and which yields isotropic carbon upon carbonization;

(b) devolitizing the pitch like substance under a vacuum at a temperature of from about 250° C. to about 400° C. until the devolitized residue has a coking value of at least 75%;

(c) shaping the devolitized residue under pressure and without a binder;

(d) carbonizing the shaped devolitized residue at a temperature in excess of 800° C. in an inert atmosphere to convert the devolitized residue into a shaped isotropic carbon article.

References Cited

UNITED STATES PATENTS

| 2,682,686 | 7/1954 | Mrozowski | 264—105 |
| 3,350,295 | 10/1967 | Hamner et al. | 264—105 |
| 3,725,240 | 4/1973 | Baum | 208—4 |

JEFFERY R. THURLOW, Primary Examiner

U.S. Cl. X.R.

106—273, 281; 208—76; 264—82, 101, 105, Digest No. 19